United States Patent
Krause et al.

(10) Patent No.: US 11,161,792 B2
(45) Date of Patent: Nov. 2, 2021

(54) VACUUM INFILTRATION SYSTEM FOR CERAMIC MATRIX COMPOSITES

(71) Applicant: Rolls-Royce High Temperature Composites Inc., Cypress, CA (US)

(72) Inventors: Thomas E. Krause, Redondo Beach, CA (US); Robert Shinavski, Mission Viejo, CA (US); Kevin Mark Lukhard, Anaheim, CA (US)

(73) Assignee: ROLLS-ROYCE HIGH TEMPERATURE COMPOSITES INC., Cypress, CA (US)

(*) Notice: Subject to any disclaimer, the term of this patent is extended or adjusted under 35 U.S.C. 154(b) by 109 days.

(21) Appl. No.: 16/508,562

(22) Filed: Jul. 11, 2019

(65) Prior Publication Data

US 2021/0009479 A1  Jan. 14, 2021

(51) Int. Cl.
| | | |
|---|---|---|
| *C04B 41/50* | (2006.01) | |
| *C04B 41/45* | (2006.01) | |
| *B28B 13/02* | (2006.01) | |
| *C04B 35/626* | (2006.01) | |

(Continued)

(52) U.S. Cl.
CPC ........ *C04B 41/5059* (2013.01); *B28B 13/021* (2013.01); *B28B 13/0275* (2013.01); *C04B 35/6263* (2013.01); *C04B 35/80* (2013.01); *C04B 41/4515* (2013.01); *C04B 2235/3826* (2013.01); *C04B 2235/483* (2013.01); *C04B 2235/524* (2013.01); *C04B 2235/5224* (2013.01); *C04B 2235/5228* (2013.01); *C04B 2235/5232* (2013.01); *C04B 2235/5236* (2013.01); *C04B 2235/5244* (2013.01); *C04B 2235/5248* (2013.01); *C04B 2235/5256* (2013.01); *C04B 2235/616* (2013.01); *F01D 5/282* (2013.01); *F05C 2253/04* (2013.01); *F05D 2300/2261* (2013.01); *F05D 2300/6033* (2013.01)

(58) Field of Classification Search
None
See application file for complete search history.

(56) References Cited

U.S. PATENT DOCUMENTS

| | | | |
|---|---|---|---|
| 9,630,885 B2 | 4/2017 | Goetz et al. | |
| 9,639,885 B2 * | 5/2017 | Brabec | G06Q 30/0635 |

(Continued)

OTHER PUBLICATIONS

Lee, Sea-Hoon, Gu, Jian, Lee, Hee Jung, "Preparation of ultra-high concentration SiC slurry and its application for PIP process," dated Feb. 10, 2019, pp. 1-6, Korea Institute of Materials Science.

*Primary Examiner* — Jose I Hernandez-Kenney
(74) *Attorney, Agent, or Firm* — Crowell & Moring LLP (57) ABSTRACT

A method for infiltrating a porous preform for a gas turbine engine is provided, which comprises providing a chamber for infiltrating a porous preform. The porous preform is positioned within a slurry confinement fixture within the chamber. A vacuum is created in the chamber. A solvent is added to the slurry confinement fixture until a pressure in the chamber is substantially equal to an equilibrium partial pressure of the solvent. A slurry is added to the slurry confinement fixture. The slurry includes the solvent and a particulate. The pressure in the chamber is increased, and the slurry is urged into the porous preform.

16 Claims, 2 Drawing Sheets

(51) Int. Cl.
 *C04B 35/80* (2006.01)
 *F01D 5/28* (2006.01)

(56) References Cited

U.S. PATENT DOCUMENTS

2017/0313629 A1\* 11/2017 Shim ..................... C04B 35/565
2019/0225552 A1\* 7/2019 Taggart ............. C04B 35/62852

\* cited by examiner

VACUUM INFILTRATION SYSTEM FOR CERAMIC MATRIX COMPOSITES

TECHNICAL FIELD

This disclosure relates to fabrication of ceramic matrix composites and, in particular, to vacuum infiltration for ceramic matrix composites.

BACKGROUND

Ceramic matrix composites (CMCs), which include ceramic fibers embedded in a ceramic matrix, exhibit a combination of properties that make them promising candidates for industrial applications that demand excellent thermal and mechanical properties along with low weight, such as gas turbine engine components. Accordingly, there is a need for inventive systems and methods including CMC materials described herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

In one example, a method is provided in which a porous preform of a component for a gas turbine engine is positioned within a chamber for infiltrating the porous preform. A vacuum is created in the chamber. A solvent is added to the chamber until a pressure in the chamber is substantially equal to an equilibrium partial pressure of the solvent. A slurry is added to the chamber. The slurry includes the solvent and a particulate. The pressure in the chamber is increased to urge the slurry into the porous preform.

In another example, a method for vacuum infiltration is provided in which a porous preform of a component for a gas turbine engine is positioned within a slurry confinement fixture. The slurry confinement fixture is housed in a chamber. The slurry confinement fixture coupled to and in fluid communication with a hopper containing a slurry. The slurry confinement fixture is coupled to and in fluid communication with a reservoir containing a solvent. A vacuum is created in the chamber. A predetermined amount of the slurry is added to the slurry confinement fixture to cover the porous preform. The slurry includes the solvent and a particulate. An amount of the solvent is added from the reservoir to the slurry confinement fixture before the predetermined amount of the slurry is added, such that no substantial evaporation of the solvent from the slurry occurs when the slurry is added to the slurry confinement fixture. A pressure in the chamber is increased to urge the slurry into the porous preform.

In yet another example, a system for vacuum infiltration is provided. The system includes a chamber. The system further includes a reservoir including a solvent. The system further includes a hopper including a slurry disposed in the hopper. The slurry includes the solvent and a particulate. The particulate makes up at least 60% of the slurry by volume. The hopper and the reservoir are in fluid communication with the slurry confinement fixture. The system further includes a porous preform for a component of a gas turbine engine. The porous preform is positioned within the slurry confinement fixture. The reservoir is configured to provide the solvent to the slurry confinement fixture. The hopper is configured to provide the slurry to the slurry confinement fixture.

A process for manufacturing a CMC component may begin with the fabrication of a two-dimensional or three-dimensional inorganic fiber preform, which forms a structural scaffold for subsequent infiltration of a ceramic matrix. To make the inorganic fiber preform, chopped fibers, continuous fibers, woven fabrics or combinations thereof are laid up, fixed and shaped into the configuration of a desired component. The fibers in the inorganic fiber preform may be made from any inorganic material that is stable at processing temperatures above about 1000 degrees Celsius and is compatible with the temperature of a molten alloy infiltrant. Suitable examples include, but are not limited to, aluminum oxide ($Al_2O_3$), mullite ($A_{16}Si_2O_{13}$), zirconium oxide ($ZrO_2$), carbon (C), graphite, silicon carbide (SiC), silicon carbon nitride, silicon nitride, and mixtures and combinations thereof. Suitable commercially available inorganic fibers include, for example, pre-ceramic SiC fibers such as those available under the trade designation HI-NICALON and SYLRAMIC from COI Ceramics, Inc., San Diego, Calif.

The inorganic fiber preform, or porous preform, may be infiltrated and partially rigidized/densified via Chemical vapor infiltration (CVI) including a low strength, compliant fiber coating to promote matrix crack deflection. Once the porous preform is shaped and partially rigidized/densified, a matrix material is infiltrated into the preform. This infiltration process includes applying to the preform a slurry having dispersed therein particles including, but not limited to, ceramic materials. As the slurry flows into the interstices between the inorganic fibers of the partially densified preform, the particles in the slurry substantially uniformly impregnate the pores and/or capillaries of the preform and come to reside in the interstices between the preform fibers.

The slurry infiltration may entail introducing a slurry formulation to a porous fiber preform in a vacuum chamber and manipulating a pressure of the chamber to promote infiltration. Slurry infiltration may occur through surfaces of the preform exposed to the slurry formulation.

In some examples, the use of vacuum infiltration may be preferred, as the vacuum infiltration may help remove residual air from partially densified and/or rigidized ceramic matrix composites that, during the slurry infiltration process, become compressed, such that the pressure of the given ceramic matrix composite may counter the applied pressure for slurry infiltration.

It may be advantageous during the infiltration of CMC components to include slurries which are powders having particles with more than one effective diameter as measured by a D50. Particles with D50 of 10-50 microns allow high solid loading slurries to be fabricated due to the high solid fraction to the low surface area. Conversely small diameter particulates, for example, on the order of 1 micron D50, have smaller remaining interstices and refine the matrix grain structure. However, the small diameter particulates are limited in their solid loading due to their high surface area to solid fraction. Combining multiple particle size distributions can allow higher solid fractions to be obtained along with a refinement of the remaining interstitial voids.

Slurries with particles having smaller effective diameters may fill smaller voids within the partially densified and/or rigidized ceramic matrix composite. It may be additionally advantageous to include slurries with high volumetric solid loadings or high solid loadings. Solid loading is an amount of suspended solids or particulate in the liquid and/or solvent. The higher the solid loading of the slurry, the more particulate may infiltrate the partially densified and/or rigidized ceramic matrix composite. Obtaining a high solid loading has importance for not introducing shrinkage cracks in the particulate network during solvent removal. Thus, there is a need for slurries that have both high volumetric solid loadings and smaller effective diameters along with a refinement of the remaining void network.

As a solid loading of a given slurry is increased and particle size is decreased, the viscosity of the slurry typically increases. Vacuum slurry infiltration of high solid loading slurries into the partially densified and/or rigidized ceramic matrix composites, or porous preforms, may be difficult due to viscosity sensitivities of the slurry with small changes in the solvent content of the slurry. In some examples, evaporation of the solvent from the slurry may lead to an undesirable increase in viscosity due to extreme sensitivity of the viscosity to small changes in a high solid loading slurry. Especially in the example of aqueous based slurries, after a sufficient amount of the slurry is dehydrated such that a chamber for infiltration reaches the equilibrium partial pressure of water, no further net dehydration of the slurry occurs. Thus, the transitory issues of dehydration/evaporation of the slurry is a problem that needs to be addressed. This problem may be particularly acute in the case of solvents having an appreciable vapor pressure, such as water. Removal of the solvent from the slurry due to evaporation may cause an increase in the viscosity of the slurry to a point that the slurry cannot flow into and/or through the porosity of the partially densified CMC. Evaporation of solvent from the slurry may occur at an introduction point of the slurry into the vacuum chamber and/or on an exterior of the porous preform or rigidized/densified ceramic matrix composite. In initial stages of the slurry infiltration, the loss of liquid from the slurry occurs predominately from the slurry that first enters the infiltration chamber. This localized dehydration of the slurry can be a significant factor when the slurry confinement fixture is small such that the introduction point is geometrically constrained, and is made more significant when the vacuum envelope is large such that the amount of solvent evaporation can be more significant. An example of this, may be multiple individual slurry containment fixtures with individual slurry introduction points with their respective partially densified preforms contained therein, all contained in a large vacuum envelope or chamber.

The use of low solid loading slurries and/or slurries having particles with larger diameters, may result in an infiltrated CMC component with high residual porosity. Particles having larger diameters may be unable to infiltrate pores, capillaries, and/or channels having relatively small diameters. Alternatively or in addition, low solid loading slurries may not provide sufficient particulate to the pores, capillaries, and/or channels of the porous preform. The resulting structure may have gaps or cavities that require subsequent filling, otherwise known as residual porosity. Material used to fill the residual porosity, for example silicon or alternatively a preceramic polymer, may not be as strong or desirable as the particulate material of the slurry, for example silicon carbide. As a result, slurry infiltrated CMC components having higher residual porosity may result in weaker, less desirable finished CMC components. Thus, another issue that needs to be addressed by the systems and methods herein is high residual porosity.

An improved system and method for vacuum infiltration of a porous preform during fabrication of a ceramic matrix composite (CMC) is described herein. One interesting feature of the systems and methods described below may be that porous preforms are infiltrated with high solid loading slurries. Alternatively, or in addition, an interesting feature of the systems and methods described below may be that porous preforms are infiltrated with slurries having both high volumetric solid loadings and small remaining voids.

Figure 1:
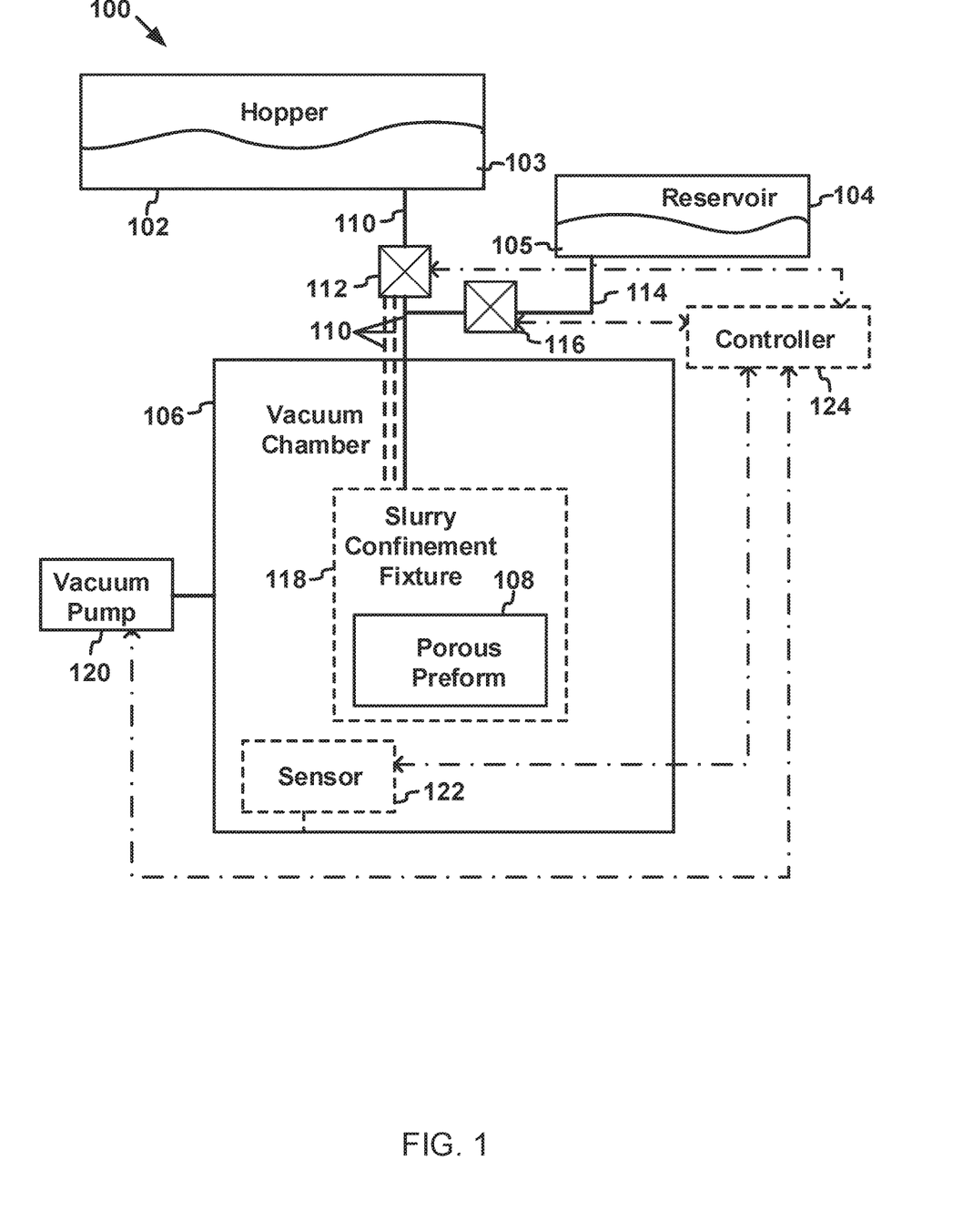
FIG. 1 illustrates a schematic showing a system for vacuum infiltration of a porous preform.

FIG. 1 illustrates a schematic example of a system 100 for vacuum infiltrating high solid loading slurries. The system 100 may include a hopper 102, a reservoir 104, a vacuum chamber 106, a slurry confinement fixture 118 and a porous preform 108 of a component of a gas turbine engine. The porous preform 108 is positioned in the slurry confinement fixture 118 within the vacuum chamber 106. The hopper 102 may be configured to provide a slurry 103 to the porous preform 108 in the slurry confinement fixture 118. The reservoir 104 may be configured to provide a solvent 105 to the vacuum chamber 106. This arrangement may have a single or multiple slurry confinement fixtures 118 each with a porous preform 108 all within the vacuum chamber 106. Additionally the slurry confinement fixture may be as precise as required to determine the geometry of the finished component, or as imprecise as a containment bag.

The hopper 102 may be any device and/or container configured to contain and distribute the slurry 103 into the vacuum chamber 106. In some examples, the hopper 102 includes a slurry transport portion 110 and a hopper valve 112.

The slurry transport portion 110 may be any structure that extends between the hopper 102 and the vacuum chamber 106. For example, the slurry transport portion 110 may be a chute, tube, and/or conveyor that directs the slurry 103 from the hopper 102 to the slurry confinement fixture(s) 118.

The hopper valve 112 may be any device that controls and/or regulates passage of the slurry 103 from the hopper 102 to the vacuum chamber 106. In some examples the hopper valve 112 may be positioned at a point along the slurry transport portion 110. Alternatively or in addition, the hopper valve 112 may be coupled to the hopper 102 and/or the vacuum chamber 106.

While the system 100 depicted in FIG. 1 is shown having a single vacuum chamber 106, slurry confinement fixtures 118, hopper 102, and reservoir 104, the system 100 may include more or less than one of each of the hopper 102, the reservoir 104, and/or the vacuum chamber 106 while maintaining the same functionality. For example, the vacuum chamber 106 may also serve the role of the slurry confinement fixture 118. Alternatively or in addition, the system 100 may contain a separate container (not shown) housing the particulate of the slurry 103, and the particulate and the solvent 105 from the reservoir 104 may be mixed in yet another container to create the slurry 103.

As shown using dashed lines in FIG. 1, in some examples, the system 100 may include multiple slurry transport portions 110. In examples where the slurry confinement fixtures 118 are positioned within the vacuum chamber 106, diameters of the slurry transport portions 110 feeding the respective slurry confinement fixtures 118 may be smaller than a diameter of the slurry transport portion 110 in examples where the vacuum chamber 106 is the slurry confinement fixture 118 fed by a single larger slurry transport portion 110. Alternatively or in addition, multiple slurry transport portions may feed a single slurry confinement fixtures 118. This is especially beneficial when the slurry confinement fixture 118 is approximately the same shape as the porous preform 108, such that all surfaces of the porous preform receives a sufficient amount of the slurry 103 to cover the surfaces.

The slurry 103 may be any composition that includes a solvent 105 and a particulate suspended in the solvent. The slurry 103 may have a viscosity in a range of 100-1000 centipoise (cP). In some examples, the slurry 103 additionally includes a pre-gellant material. The slurry may also include optional gelation initiators, promotors, and/or other additives.

The particulate may be particles of ceramic material suspended in the slurry 103. In some examples the particulate may include aluminum nitride, aluminum diboride, boron carbide, aluminum oxide, mullite, zirconium oxide, carbon, silicon carbide, silicon nitride, transition metal nitrides, transition metal borides, rare earth oxides, and mixtures and combinations thereof.

The slurry 103 may have a predetermined solid loading volume percentage (vol %). The vol % is indicative of a percentage of the slurry 103 that is the particulate. For example, the slurry 103 may be prepared at 65 vol % solid loading, which means that 65% of the slurry 103 is the particulate and 35% of the slurry 103 may be the solvent 105 or other additives. In some examples, the vol % solid loading of the slurry 103 may be greater than or equal to 65 vol %.

The size of the particles in the particulate may vary widely, and typically have a major dimension of less than about 50 µm. In other examples, the size of the particles may be greater than 50 µm depending upon the relative sizes of the pores, channels, and/or capillaries in the porous preform 108. In some examples, the particles may have a wide variety of regular or irregular shapes including, for example, spheres, rods, disks, and the like. In some examples, the major dimensions of the particles may form a monomodal, a bimodal, or a multimodal distribution. In some embodiments, the particles are generally spheres with a diameter of less than about 50 µm, and the diameters of the particles make up a multimodal distribution to more effectively flow within the fibers of the porous preform 108 and pack more densely within the pores of the porous preform 108.

The reservoir 104 may be any container configured to hold the solvent 105. In some examples, the reservoir 104 includes a solvent transport portion 114 and a reservoir valve 116. The solvent transport portion 114 may be any structure that extends between the reservoir 104 and the vacuum chamber 106. For example, the solvent transport portion 114 may be a chute, tube, and/or conveyor that directs the solvent 105 from the reservoir 104 to the slurry confinement fixture 118. In other examples, the solvent transport portion 114 may extend between the reservoir 104 and the slurry transport portion 110, such that the solvent 105 enters the vacuum chamber 106 via the slurry transport portion 110. The reservoir valve 116 may be any device that controls passage of the solvent 105 from the reservoir 104 to the vacuum chamber 106. In some examples the reservoir valve 116 may be positioned at a point along the solvent transport portion 114. Alternatively or in addition, the reservoir valve 116 may be coupled to the hopper 102 and/or the vacuum chamber 106 or the slurry transport portion 110. The reservoir valve 116 is on the vacuum side of the pressure boundary between the interior and exterior of the vacuum chamber 106 and/or the slurry confinement fixture 118.

The solvent 105 in which the particulate is suspended may be any aqueous and/or organic solvent, such as water. In some examples, the solvent 105 is water only. In other examples, the solvent 105 includes water and other components. Other solvents that may be used in the slurry include, but are not limited to alcohols, ethanol, methanol isopropyl alcohol, methyl ethyl ketone, or toluene. The solvent 105 may be selected to disperse or dissolve the pre-gellant material and the optional polymerization initiator.

The solvent 105 has an equilibrium partial pressure ($p_{solv}$). The equilibrium partial pressure of the solvent is also known as the vapor pressure of the solvent. The $p_{solv}$ may be a pressure at a given temperature at which the solvent 105 in a liquid phase is in equilibrium with the solvent 105 in a gaseous phase. Once the liquid solvent and gaseous solvent are in equilibrium, no net loss and/or gain of liquid solvent to gaseous solvent and/or gaseous solvent to liquid solvent occurs.

The vacuum chamber 106 may be any container which houses the slurry confinement fixture 118 and the porous preform 108. In some examples, a pressure in the vacuum chamber 106, may be less than 100 milliTorr such that essentially all of the air is removed from the chamber.

The vacuum chamber 106 may be configured to have a variable pressure. For example, during the introduction of the solvent and the slurry, a first pressure of the vacuum chamber 106 may be less than 100 milliTorr. During the infiltration of the porous preform 108, a second pressure of the vacuum chamber 106 may be in substantially equal to the equilibrium partial pressure of the solvent 105. A pressure is substantially equal to the equilibrium partial pressure of the solvent 105, if the pressure is 70% or more the equilibrium partial pressure of the solvent. After introduction of the slurry into the slurry confinement fixture 118 containing the porous preform 108, the pressure may be increased to a third pressure substantially equal to or greater than atmospheric pressure to produce a pressure differential to drive the slurry 103 into the porous preform 108. While higher pressures can be beneficial for driving the slurry 103 into the porous preform 108, additional pressure may offer no additional benefit in some examples, but increases the complexity and size of the pressure vessel. Pressures greater than approximately 3 atmospheres may not be of additional benefit.

The vacuum chamber 106 is maintained at a given temperature that is compatible with the slurry 103 and the solvent 105. In some examples the temperature may be maintained within a range of 10-50° C. In some examples, the temperature may be held constant throughout the introduction of the solvent 105 and the slurry 103 and the infiltration process. Alternatively or in addition, the temperature may be varied after the slurry 103 and solvent 105 introduction and the infiltration process.

The vacuum chamber 106 may have a volume in the range of 0.02 liters to 500 liters. The volume and/or size of the vacuum chamber 106 may depend on the size of the porous preform 108 and the number of porous preforms 108 and their respective slurry containment fixtures 118 in the vacuum chamber 106. In some examples, a volume of the vacuum chamber is 130 L.

The porous preform 108 may be any preform for a component of a gas turbine engine. The porous preform 108 may include multiple ceramic fibers arranged together to define a predetermined shape or preform. The porous preform 108 includes pores, channels, and/or capillaries which are configured to receive the slurry 103 during infiltration. In some examples, the porous preform may be an impregnated porous preform. The porous preform 108 may be partially densified and/or rigidized.

The slurry confinement fixture 118 may be a fixture disposed in the chamber 106 and configured to house the porous preform 108 for infiltration. The slurry confinement fixture may be rigid and configured to prevent the slurry 103 or solvent 105 from leaking into the chamber 106. In some examples, the system 100, may include one or more slurry confinement fixtures 118 positioned inside of the vacuum chamber 106. The porous preform 108 may be positioned in the slurry confinement fixture 118 for infiltration. The slurry transport portion 110 may extend into the slurry confinement fixture 118 for distribution of the slurry 103 on the porous preform 108. The solvent transport portion 114 may also extend into the slurry confinement fixture 118 for distribution of the solvent 105 into the slurry confinement fixture 118. In other examples, the solvent transport portion 114 may extend into and is in fluid communication with the slurry transport portion 110. In this example, the solvent 105 may travel from the reservoir 104, through the reservoir valve 116, through the slurry transport portion 110, and into the vacuum chamber 106 and/or the slurry confinement fixture 118. The slurry confinement fixture 118 may limit the total volume that the slurry 103 occupies during infiltration. In other words, the slurry 103 need only sufficiently fill the volume of the slurry confinement fixture 118 to the point that the porous preform 108 is fully submerged in the slurry rather than fill the entire vacuum chamber 106 or the entire slurry confinement fixture 118.

During operation, substantially all air present in the vacuum chamber 106 is removed by vacuum evacuation using a vacuum pump 120. Substantially all air, rather than all air, is removed, because environmental limitations prevent the degree to which a container may be vacuum evacuated. The vacuum chamber 106 is evacuated, such that the vacuum chamber has as low of a pressure as possible. The vacuum chamber 106 is then isolated from the vacuum pump 120.

The reservoir valve 116 is opened and an amount of the solvent 105 is added to the vacuum chamber 106 and/or the slurry confinement fixture 118 in the vacuum chamber via the solvent transport portion 114. The solvent 105 may be urged into the vacuum chamber 106 due to the force of gravity and/or a natural pressure gradient that exists between the interior and exterior of the vacuum chamber 106. In some examples, the solvent 105 is introduced into the vacuum chamber as a vapor and/or gas. In further examples, the solvent 105 may be introduced in a volatile liquid phase. Alternatively or in addition, once the reservoir valve 116 is opened, the solvent 105 may evaporate out of the reservoir 104 and into the vacuum chamber 106 and/or the slurry confinement fixture 118. In some examples, an amount of the solvent 105 is added to the vacuum chamber 106 and/or the slurry confinement fixtures 118, such that, when the slurry 103 is added, a pressure of the vacuum chamber 106 is substantially equal to the equilibrium partial pressure of the solvent ($P_{solv}$). In other words, an amount of the solvent 105 is added, such that no substantial evaporation of solvent 105 from the slurry 103 occurs.

An amount of the solvent 105 needed to achieve $P_{solv}$ may further depend on the volume and the temperature of the vacuum chamber 106. In the example of water as the solvent 105, 10 grams of the solvent 105 is added to the reservoir 104. The reservoir valve is opened and 2.5-3.0 grams of the solvent 105 may evaporate into the vacuum chamber 106 before the slurry infiltration. After, the solvent 105 is added a total pressure in the vacuum chamber may be approximately 21 Torr, which is substantially equal to the equilibrium partial pressure for water at a given temperature. Evaporation of solvent from the slurry is not substantial as long as the slurry 103 is able to infiltrate the porous preform 108.

In other words, where the solvent 105 is water, the system 100 may be configured to add the solvent 105 until a dew point is reached. The dew point is the atmospheric temperature below which water droplets begin to condense. The dew point is dependent upon pressure and humidity.

After the addition of the solvent 105, the hopper valve 112 is opened and a predetermined amount of the slurry 103 is added to the vacuum chamber and/or the bag 118 via the slurry transport portion 110. The slurry 103 may be added in a predetermined amount that may, at least in part, cover a surface of the porous preform 108. The slurry may be urged into the vacuum chamber 106 due to the natural pressure gradient and/or the force of gravity. The slurry 103 may completely cover the porous preform 108. Because the pressure in the vacuum chamber 106 is equal to $P_{solv}$, the solvent 105 in the slurry 103, which is in liquid form, may be in equilibrium with the solvent 105 in the vacuum chamber 106 and/or bag 118, which is in gaseous or vapor form. In other words, because the vacuum chamber 106 is at the $P_{solv}$, no net evaporation of the solvent 105 from the slurry 103 occurs.

After a predetermined amount of the slurry 103 is added to the slurry confinement fixture 118, the pressure in the vacuum chamber 106 may be increased. For example, the pressure in the vacuum chamber 106 may be increased from a first pressure, equal to the $P_{solv}$, to a second pressure that is greater than or equal to the atmospheric pressure. The increase in pressure from the first pressure to the second pressure urges the slurry into the pores, channels, and/or capillaries of the porous preform 108 resulting in a fully slurry infiltrated preform.

In some examples, a small percentage of the solvent 105 vapor may be forced into the porous preform 108 along with the slurry 103. The small percentage of the solvent 105 vapor may condense, due to the pressure of the slurry 103 into liquid form. The condensed solvent 105 may mix back in with the slurry 103, such that pockets are not formed in the infiltrated preform. Because the system 100 prevents and/or limits evaporation/dehydration of the solvent 105 from the slurry 103, slurries having high viscosities, for example slurries with high volumetric solid loading and/or smaller particle sizes, may be employed for vacuum infiltration of the porous preform. Higher viscosity slurries, for example 500-1000 cP, may allow for a higher volume of particulate to infiltrate the porous preform 108 than slurries having lower viscosities, for example less than 500 cP. In some examples, only one porous preform 108 may be infiltrated at once. In other examples, multiple porous preforms 108 for different or the same parts of the gas turbine engine may be infiltrated at the same time.

After the vacuum infiltration of the slurry 103 into the porous preform, the resultant preform may be finished and/or further densified by silicon melt infiltration or alternatively by polymer impregnation pyrolysis of a preceramic polymer.

Figure 2:
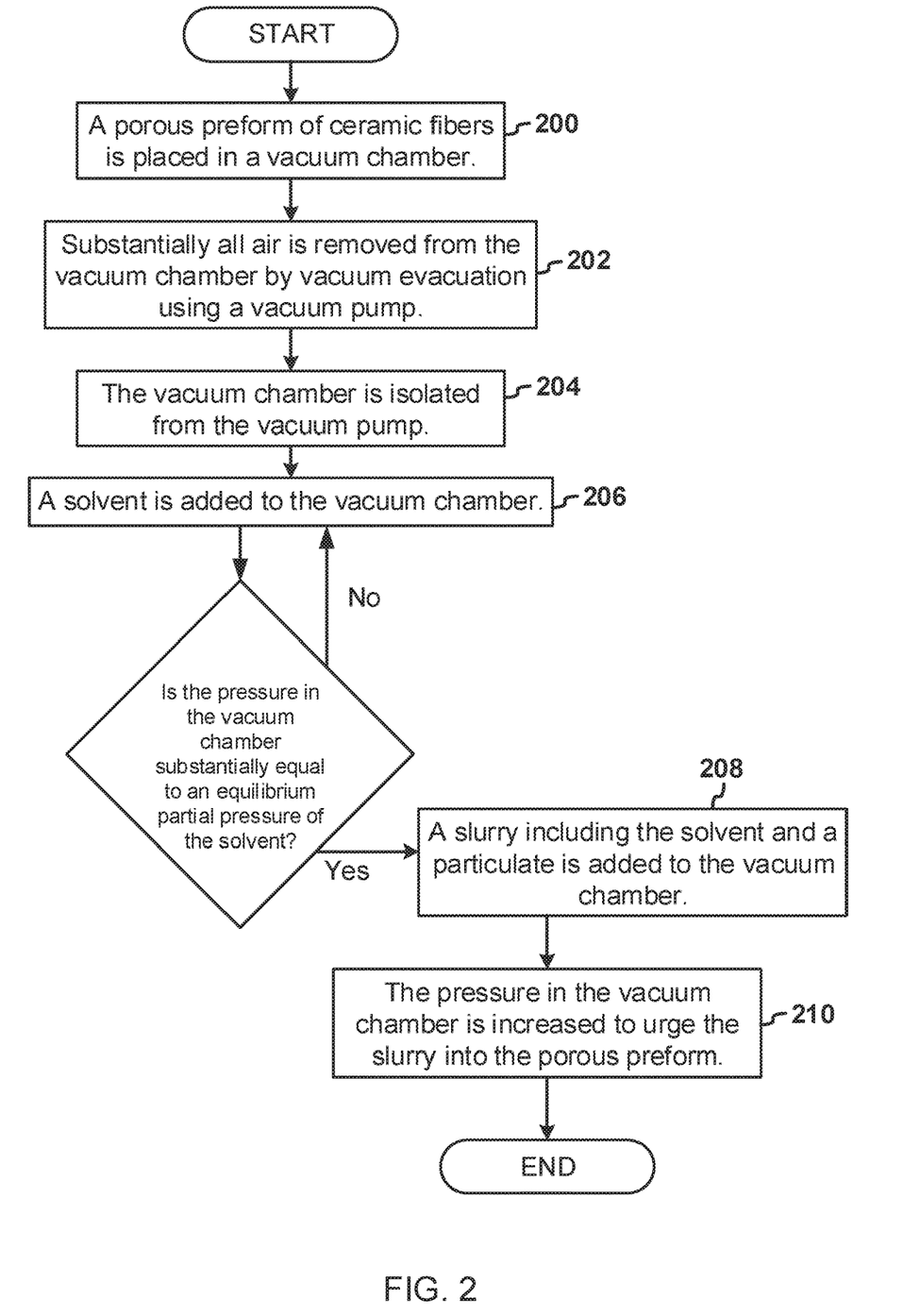
FIG. 2 illustrates a flow diagram of an example of a method of vacuum infiltration of the porous preform.

FIG. 2 illustrates a flow diagram of an example of steps to infiltrate the porous preform 108. A porous preform 108 of ceramic fibers is placed in a vacuum chamber 106 (200). Substantially all air is removed from the vacuum chamber 106 by vacuum evacuation using the vacuum pump 120 (202). The vacuum chamber 106 is isolated from the vacuum pump 120 (204). A solvent 105 is added to the vacuum chamber 106 (206). If a pressure in the vacuum chamber 106 is substantially equal to the equilibrium partial pressure ($P_{solv}$) of the solvent 105, a slurry 103 including the solvent 105 and a particulate is added to the vacuum chamber 106 (208). If the pressure in the vacuum chamber 106 is not substantially equal to the equilibrium partial pressure (Psolv) of the solvent 105, additional solvent 105 is added to the vacuum chamber 106 (206). The pressure in the vacuum chamber 106 is increased to urge the slurry 103 into the porous preform 108 (210).

The steps may include additional, different, or fewer operations than illustrated in FIG. 2. The steps may be executed in a different order than illustrated in FIG. 2. For example, the slurry infiltrated preform may bind the slurry into a contiguous matrix by using a polymer impregnation process (PIP). In the PIP, a silicon carbide containing polymer, e.g. SMP-10 (Starfire Systems) may be liquid infiltrated, cured, and cerammed. PIP densification may require multiple cycles to obtain low residual porosity due to the low volumetric yield of the polymer. Thus, starting with less residual porosity by utilizing a higher loading slurry may result in fewer PIP cycles required to achieve the targeted residual porosity level.

In some examples, following slurry infiltration, the preform may optionally be heated to increase the rate at which the pre-gellant materials at least partially form a gel in the interstices between the preform fibers. The temperature selected to cause gel formation may vary widely depending on the pre-gellation materials and polymerization initiators (if any) selected for use in the slurry composition, but in some embodiments a temperature of about 30° C. to about 80° C., or about 35° C. to about 45° C., have been found to be suitable. The preform should be heated for a time sufficient to ensure that sufficient slurry gellation has occurred throughout the volume of the preform to maintain the ceramic particles within the pores of the preform during subsequent processing steps, and in some examples the temperature of the preform is maintained at the gellation temperatures discussed above for about 1 hour to about 4 hours, or about 2 hours to about 3 hours.

In some examples, after the slurry is sufficiently or fully gelled in the preform, excess gelled slurry is optionally removed from the fully slurry infiltrated preform. The excess gelled slurry may be removed from the preform by any suitable method, and mechanical surface treatment techniques like brushing or polishing with an abrasive article have been found to be suitable.

Additionally, prior to or following a surface treatment, additional impregnation step(s) may be performed to ensure that the preform is fully impregnated with particles. The additional impregnation steps may be performed with the same or a different slurry composition as the initial impregnation step, or may include other materials such as, for example, a high char yielding resin, a pre-ceramic polymer, or mixtures thereof.

For example, a secondary slurry for use in the additional impregnation step(s) may include carbon black in a suitable solvent such polyvinylpyrrolidone, isopropanol, polyvinyl alcohol, water, and mixtures thereof. In another non-limiting example, suitable high-char yielding resins may include phenolic flake dissolved in a suitable solvent such as an alcohol like isopropanol. In yet another non-limiting example, suitable pre-ceramic polymers may include polycarbosilane, polycarbosilazane, and mixtures and combinations thereof.

After the excess slurry is removed, the resulting cast is optionally at least partially dried to remove water or other solvents and form a green composite article. The drying may be conducted in any suitable manner, and in various example embodiments the cast may be dried at room temperature at atmospheric pressure or at room temperature under vacuum at about 1 Torr, or may be dried at ambient pressure at a temperature of up to about 150° C. To reduce shrinkage cracks within the particulate casting within the partially densified preform, slower drying is preferred. Increased drying temperatures may cause the gel to partially or fully decompose, and as such should be avoided.

Following the optional drying step, a molten metal alloy infiltrant is applied to the green composite article. The molten metal alloy wicks between the ceramic particles in the green composite article and occupies the interstices between the particles until the green composite article is fully densified to less than about 5%, or less than about 3%, or less than about 1%, porosity to form a composite article. In some examples, the alloy infiltrant includes Si, B, Al, Y, Ti, Zr, oxides thereof, and mixtures and combinations thereof.

In some examples, the temperature for metal alloy infiltration such as for example, Si, is about 1400° C. to about 1500° C., which in some embodiments may cause decomposition and substantially complete or partial removal of the gel. Under these conditions, the duration of the infiltration may be between about 15 minutes and 4 hours, or about 60 minutes to about 20 minutes. The infiltration process may optionally be carried out under vacuum, but in other embodiments may be carried out in inert gas under atmospheric pressure to limit evaporation losses.

In some examples, the final composite article includes about 20 vol % to 60 vol % coated fiber, or about 30 vol % to 50 vol %; about 1 vol % and 79 vol % infiltrated particles, or about 35 vol % to about 60 vol %; and about 1 vol % to about 79 vol % infiltrated alloy, or about 5 vol % to about 20 vol %. In some examples, a small amount of gelled material, typically less than about 1.0 wt %, or less than about 0.5 wt %, remains after the alloy infiltration step. The composite article includes no macroscopic porosity, which means pores with an average pore size of less than about 200 µm, or less than about 50 µm, or less than about 2 µm, and includes a porosity of less than about 5%, or less than about 3%, or less than about 1%.

Following the finishing and/or further densification of the resultant preform, for example, by silicon melt infiltration or polymer impregnation pyrolysis of a preceramic polymer, the final composite article may be optionally machined to form a suitable part for use in for example, a turbine engine or an aircraft engine.

Each component may include additional, different, or fewer components. For example, the slurry may optionally include less than about 10 wt % of additives such as, for example, dispersants, binders, surfactants, pH adjustors, and the like.

In some examples, the slurry may include about 30 wt % to about 90 wt % of particles, about 0.5 wt % to about 30 wt % of pre-gellant material, about 0.1 wt % to about 10 wt % of a polymerization initiator, about 0.25 wt % to about 20 wt % additives, and about 10 wt % to about 70 wt % water.

In some examples, the slurry includes a SiC solids content of about 60 wt % to about 90 wt %, and the SiC includes coarse spherical particles with a diameter of about 15 µm and fine spherical particles with a diameter of about 1 µm.

The slurry 103 may further include a pre-gellant material. The pre-gellant material may include any material that may be processed to form a gel-like network within the interstices of the fibers of the preform to evenly distribute and effectively retain the ceramic materials within the preform as the preform is subsequently processed. In this application the term gel refers to a viscous, jelly-like colloid including a disperse phase of the particles. Examples of the pre-gellant material includes a polysaccharide such as methyl cellulose, carboxymethyl cellulose, hydroxypropyl methyl cellulose, gellan gum, agarose, carrageenan, and mixtures and combinations thereof.

In other examples, the pre-gellant material includes one or more gelation monomers which, when polymerized, form a gel within the pores of the preform. Examples of the monomeric pre-gellant material may include acrylamides, acrylates, vinyls, allyls, and mixtures and combinations thereof. The gelation monomers may optionally include one, two, or more functional groups such as, for example, (meth) acryl, acrylamido, vinyl, allyl, and the like.

In yet other examples, the slurry may contain only the solvent 105 and the particulate without the pre-gellant material.

In some embodiments, the slurry may include an optional polymerization initiator to aid gelation of the pre-gellant material. The polymerization initiator may vary widely depending on the selected monomeric pre-gellant material, and in various example embodiments may include a peroxide, a persulfate, a perchlorate, an amine, an azo compound, and mixtures and combinations thereof.

The system 100 may be implemented with additional, different, or fewer components. For example, the system 100 may include a basin positioned in the vacuum chamber 106 to catch excess solvent 105. In some examples, the catch basin may be positioned at a point where the solvent 105 into The system 100 may further include one or more sensors 122 positioned within the vacuum chamber 106. The sensor 122 or sensors may be configured to determine predetermined parameters, such as a temperature, pressure, and/or humidity of the vacuum chamber 106.

The system 100 may be further configured to operate manually and/or automatically. In examples where the system 100 operates automatically, the system 100 may include a controller. The controller may be configured to receive a signal and/or a sensed pressure from the sensor. The controller may be configured to cause the vacuum pump 120 based to turn on and off based on a sensed pressure transmitted from the sensor 122, for example when the pressure is less than 10 milliTorr. The controller may be further configured to cause the hopper valve 112 and/or the reservoir valve 116 to open and shut based on the sensed pressure transmitted from the sensor. In other examples, an operator may preset the controller to cause opening and closing of the hopper valve 112 and the reservoir valve 116 based on a series of predetermined parameters, for example, temperature, pressure, and/or humidity of the vacuum chamber 106.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While some examples have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

A first aspect relates to a method comprising: positioning a porous preform of a component for a gas turbine engine within a slurry confinement fixture, wherein the slurry confinement fixture is disposed housed in a chamber for infiltrating the porous preform; creating a vacuum in the chamber; creating a vacuum in the chamber; adding a solvent to the chamber or the slurry confinement fixture until a pressure in the chamber is substantially equal to an equilibrium partial pressure of the solvent; adding a slurry to the slurry confinement fixture, wherein the slurry includes the solvent and a particulate; and increasing the pressure in the chamber to urge the slurry into the porous preform.

A second aspect relates to the method of aspect 1, wherein the chamber further comprises a slurry confinement fixture disposed in the chamber, wherein the porous preform is positioned within the slurry confinement fixture, wherein the adding the slurry to the chamber further comprises adding the slurry to the slurry confinement fixture, and wherein the adding the solvent to the chamber further comprises adding the solvent to the slurry confinement fixture.

A third aspect relates to the method of any preceding aspect, wherein the solvent is water, wherein the adding the solvent to the slurry confinement fixture further comprises adding between 0.5 milligrams to 10 grams to the slurry confinement fixture before the adding the slurry to the slurry confinement fixture.

A fourth aspect relates to the method of any preceding aspect, wherein the slurry confinement fixture includes a plurality of slurry confinement fixtures and the porous preform includes a plurality of porous preforms, wherein each of the slurry confinement fixtures is configured to receive a respective one of the porous preforms.

A fifth aspect relates to the method of any preceding aspect, wherein a viscosity of the slurry is greater than 500 cP.

A sixth aspect relates to the method of any preceding aspect, wherein the particulate makes up at least 60% of the slurry by volume.

A seventh aspect relates to the method of any preceding aspect, wherein the particulate comprises silicon carbide particles.

An eighth aspect relates to the method of any preceding aspect, wherein the slurry has a viscosity greater than 700 cP.

A ninth aspect relates to the method of any preceding aspect, wherein the solvent is an alcohol.

A tenth aspect relates to the method of any preceding aspect, wherein a volume of the chamber is between 0.02 liters to 500 liters.

An eleventh aspect relates to a method for vacuum infiltration comprising: positioning a porous preform of a component for a gas turbine engine within a slurry confinement fixture, the slurry confinement fixture is disposed in a chamber, the slurry confinement fixture is coupled to and in fluid communication with a hopper containing a slurry, and the slurry confinement fixture is coupled to and in fluid communication with a reservoir containing a solvent; creating a vacuum in the chamber; adding a predetermined amount of the slurry to the slurry confinement fixture to cover the porous preform, the slurry comprising the solvent and a particulate; adding an amount of the solvent from the reservoir to the slurry confinement fixture before adding the predetermined amount of the slurry, such that no substantial evaporation of the solvent from the slurry occurs when the slurry is added to the slurry confinement fixture; and increasing a pressure in the chamber to urge the slurry into the porous preform.

A twelfth aspect relates to the method of any preceding aspect, wherein the adding the solvent comprises increasing the chamber from a first pressure that is substantially zero to a second pressure that substantially equal to an equilibrium partial pressure of the solvent, wherein the increasing the pressure in the chamber to urge the slurry into the porous preform further comprises increasing the pressure in the chamber from the second pressure to a third pressure, wherein the third pressure is greater than or equal to atmospheric pressure.

A thirteenth aspect relates to the method of any preceding aspect, wherein adding an amount of the solvent from the reservoir further comprises filling the reservoir with 10 grams of the solvent, opening a reservoir valve, and allowing at least 2 grams of the solvent to evaporate into the slurry confinement fixture.

A fourteenth aspect relates to the method of any preceding aspect, wherein the hopper and the reservoir further comprise a hopper valve and a reservoir valve respectively, wherein the method further comprises controlling a flow of the slurry into the slurry confinement fixture with the hopper valve and controlling a flow of the solvent into the slurry confinement fixture with the reservoir valve.

A fifteenth aspect relates to the method of any preceding aspect, wherein the chamber further comprises a sensor, wherein the method further comprises sensing a predetermined parameter of the chamber.

A sixteenth aspect relates to the method of any preceding aspect, wherein a controller causes the hopper valve and the reservoir valve to open and close based on the sensed predetermined parameter.

A seventeenth aspect relates to the system for vacuum infiltration comprising: a chamber; a slurry confinement fixture positioned in the chamber; a reservoir including a solvent; a hopper including a slurry disposed in the hopper, the slurry comprising the solvent and a particulate, wherein the particulate makes up at least 60% of the slurry by volume, wherein the hopper is in fluid communication with the slurry confinement fixture and the reservoir is in fluid communication with the slurry confinement fixture; and a porous preform for a component of a gas turbine engine, the porous preform positioned within the slurry confinement fixture, wherein the reservoir is configured to provide the solvent to the slurry confinement fixture, and wherein the hopper is configured to provide the slurry to the slurry confinement fixture.

An eighteenth aspect relates to the system of any preceding aspect, wherein the slurry confinement fixture has a same shape as the porous preform for the component of the gas turbine engine.

A nineteenth aspect relates to the system of any preceding aspect, further comprising a sensor, a reservoir valve and a controller, wherein the reservoir valve is configured to control a flow of the solvent from the reservoir to the slurry confinement fixture, wherein the controller is configured to cause the reservoir valve to open allowing the solvent to flow into the chamber until a sensed pressure of the chamber is substantially equal to an equilibrium partial pressure of the solvent.

A twentieth aspect relates to the system of any preceding aspect, further comprising a hopper valve configured to control a flow of the slurry from the hopper to the slurry confinement fixture, wherein the controller is configured to cause the hopper valve to open and close to fill the slurry confinement fixture with a predetermined amount of the slurry, wherein the controller is further configured to operate the hopper valve to cause a pressure of the chamber to increase.

In addition to the features mentioned in each of the independent aspects enumerated above, some examples may show, alone or in combination, the optional features mentioned in the dependent aspects and/or as disclosed in the description above and shown in the figures.

What is claimed is:
1. A method comprising:
    positioning a porous preform of a component for a gas turbine engine within a chamber for infiltrating the porous preform;
    creating a vacuum in the chamber;
    adding a solvent to the chamber until a pressure in the chamber is substantially equal to an equilibrium partial pressure of the solvent;
    adding a slurry to the chamber, wherein the slurry includes the solvent and a particulate; and
    increasing the pressure in the chamber to urge the slurry into the porous preform.
2. The method of claim 1, wherein the chamber further comprises a slurry confinement fixture disposed in the chamber, wherein the porous preform is positioned within the slurry confinement fixture, wherein the adding the slurry to the chamber further comprises adding the slurry to the slurry confinement fixture, and wherein the adding the solvent to the chamber further comprises adding the solvent to the slurry confinement fixture.
3. The method of claim 2, wherein the solvent is water, wherein the adding the solvent to the slurry confinement fixture further comprises adding between 0.5 milligrams to 10 grams to the slurry confinement fixture before the adding the slurry to the slurry confinement fixture.
4. The method of claim 2, wherein the chamber further includes a plurality of slurry confinement fixtures, the slurry confinement chamber including one of the plurality of slurry confinement fixtures, and wherein the gas turbine engine further includes a plurality of porous preforms, the porous preform including one of the plurality of porous preforms, wherein each of the plurality of slurry confinement fixtures is configured to receive a respective one of the plurality of porous preforms.
5. The method of claim 1, wherein a viscosity of the slurry is greater than 500 cP.
6. The method of claim 1, wherein the particulate makes up at least 60% of the slurry by volume.
7. The method of claim 1, wherein the particulate comprises silicon carbide particles.
8. The method of claim 1, wherein the slurry has a viscosity greater than 700 cP.
9. The method of claim 1, wherein the solvent is an alcohol.
10. The method of claim 1, wherein a volume of the chamber is between 0.02 liters to 500 liters.
11. A method for vacuum infiltration comprising:
    positioning a porous preform of a component for a gas turbine engine within a slurry confinement fixture, the slurry confinement fixture is disposed in a chamber, the slurry confinement fixture is coupled to and in fluid communication with a hopper containing a slurry, and the slurry confinement fixture is coupled to and in fluid communication with a reservoir containing a solvent;
    creating a vacuum in the chamber;

adding a predetermined amount of the slurry to the slurry confinement fixture to cover the porous preform, the slurry comprising the solvent and a particulate;

adding an amount of the solvent from the reservoir to the slurry confinement fixture before adding the predetermined amount of the slurry, such that no substantial evaporation of the solvent from the slurry occurs when the slurry is added to the slurry confinement fixture; and increasing a pressure in the chamber to urge the slurry into the porous preform.

12. The method of claim 11, wherein the adding the solvent comprises increasing the chamber from a first pressure that is substantially zero to a second pressure that substantially equal to an equilibrium partial pressure of the solvent, wherein the increasing the pressure in the chamber to urge the slurry into the porous preform further comprises increasing the pressure in the chamber from the second pressure to a third pressure, wherein the third pressure is greater than or equal to atmospheric pressure.

13. The method of claim 11, wherein adding the amount of the solvent from the reservoir further comprises filling the reservoir with 10 grams of the solvent, opening a reservoir valve, and allowing at least 2 grams of the solvent to evaporate into the slurry confinement fixture.

14. The method of claim 11, wherein the hopper and the reservoir further comprise a hopper valve and a reservoir valve respectively, wherein the method further comprises controlling a flow of the slurry into the slurry confinement fixture with the hopper valve and controlling a flow of the solvent into the slurry confinement fixture with the reservoir valve.

15. The method of claim 14, wherein the chamber further comprises a sensor, wherein the method further comprises sensing a predetermined parameter of the chamber.

16. The method of claim 15, wherein a controller causes the hopper valve and the reservoir valve to open and close based on the sensed predetermined parameter.

\* \* \* \* \*